United States Patent [19]

Bair

[11] 3,839,830
[45] Oct. 8, 1974

[54] ANTI-VIBRATION WORK REST FOR GRINDERS

[75] Inventor: James G. Bair, Wexford, Pa.

[73] Assignee: Fox Grinders, Inc., Pittsburgh, Pa.

[22] Filed: Apr. 27, 1973

[21] Appl. No.: 354,945

[52] U.S. Cl. ............. 51/238 S, 64/13, 269/310
[51] Int. Cl. ................. B24b 41/06, B23b 3/00
[58] Field of Search ........ 51/23 S R, 23 S; 269/310; 248/22; 64/11, 13, 27 NM

[56] References Cited
UNITED STATES PATENTS

| 879,903 | 2/1908 | Redway | 248/22 |
| 1,734,853 | 11/1929 | Gurnea | 269/310 |
| 1,871,708 | 8/1932 | Lea | 248/22 |
| 1,948,193 | 2/1920 | Thompson | 248/22 |
| 2,202,940 | 6/1940 | Armington | 248/22 |
| 3,284,962 | 11/1966 | Hott | 51/217 R |
| 3,344,774 | 10/1967 | Swindells | 269/310 |
| 3,477,246 | 11/1969 | Martin | 64/11 R |

Primary Examiner—Al Lawrence Smith
Assistant Examiner—Marc R. Davidson
Attorney, Agent, or Firm—Buell, Blenko & Ziesenheim

[57] ABSTRACT

The specification discloses a work rest for grinders constructed so as to reduce the intensity of noise generated when grinding a metal object on the grinder wheel. The work rest comprises an upper metal plate, a lower metal plate, and a relatively thin intervening sheet of energy absorbing material, all tightly secured together. A mounting spindle fits into a central hole in the lower plate and is welded thereto.

6 Claims, 2 Drawing Figures

PATENTED OCT 8 1974  3,839,830

ANTI-VIBRATION WORK REST FOR GRINDERS

This invention relates to work rest devices for grinders, especially to such devices so constructed as to minimize the vibration of the work piece contacting the grinder wheel, and incidentally reduce the decibel level of the sound of the grinding operation.

In grinders of various types wherein the work piece or object to be ground is held manually in contact with the grinder wheel, an accessory device termed a "work rest" is provided on which the work piece is supported or braced while being pressed manually into contact with the grinder wheel.

In such grinding operations, the work rest is usually of metal and consequently allows vibration of the work piece while pressed against the grinder wheel. The level of noise thus produced by reason of vibratory contact of the work piece with the grinder wheel and with the work rest is such as to become intolerable if the workman is exposed to such noise for a protracted or extended time. The fatigue thus induced in the workman makes for inefficiency and even is conducive to lack of alertness.

It is accordingly an object of my invention to provide a work rest by which the vibrations of the work piece, while supported thereon in contact with a grinder wheel, are absorbed and the decibel level of the grinding operation incidentally reduced relative to levels customarily encountered while using conventional work rest devices.

To obtain this objective, I provide a work rest device which is essentially a sandwich comprising two metal plates and an intervening layer or sheet of energy absorbing material, one plate having a mounting spindle attached thereto and the other providing a support area for a work piece.

A preferred embodiment of the invention is hereafter described in detail in connection with the accompanying drawings, wherein.

Figure 1:
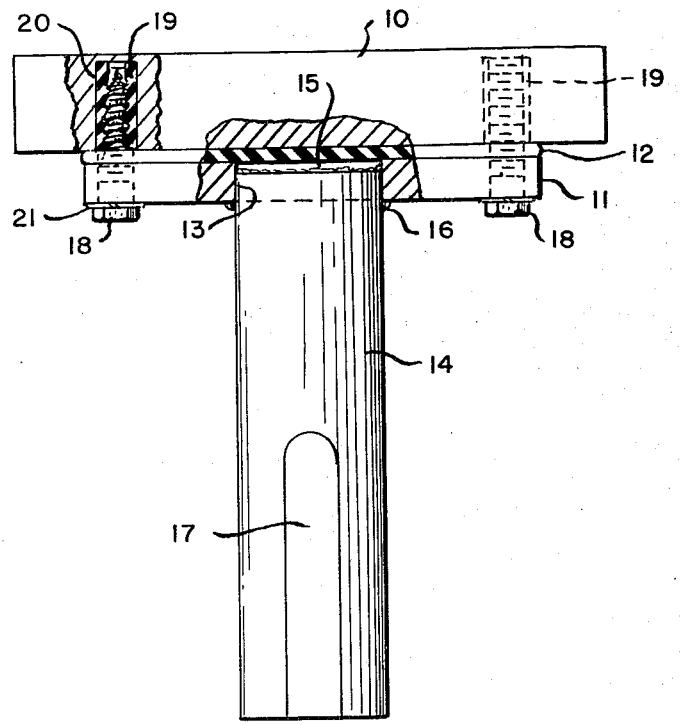
FIG. 1 is a side elevational view of the work rest device.
Figure 2:
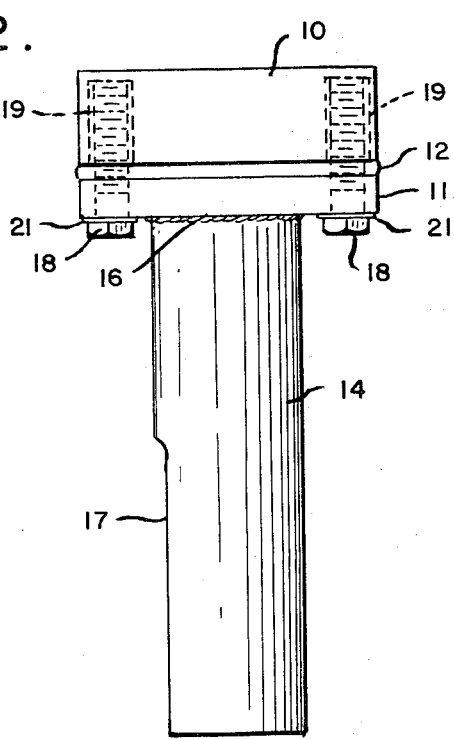
FIG. 2 is a profile or end view of the device shown in FIG. 1.

Referring to the drawings, the work rest device there shown comprises an upper metal plate 10, a lower metal plate 11, and an intervening sheet or pad 12 of energy absorbing material, such as elastomeric compounds, cork and the like. The plates 10 and 11 are preferably made of steel.

The lower plate 11 has a central bore 13 in which fits one end of a mounting spindle 14, preferably in the form of a steel rod of generally circular cross section. As especially evident in FIG. 1, the end of the spindle 14 stops short of the intervening sheet 12 and is welded circularly at 15 to the wall of the bore 13 in the lower plate. Also, for additional rigidity, the spindle is welded circularly at 16 to the face of the lower plate at the point of entry of the spindle into the bore 13.

Spindle 14 is provided with a flat face 17 which extends longitudinally of the spindle for substantially half the length thereof. While not shown, it will be understood that the spindle fits closely into a bore of a fixed support member and is tightly locked at various levels relative to the grinder wheel by means of a locking screw (not shown) the end of which presses on the flat face 17 of the spindle.

The two metal plates 10 and 11 with the intervening sheet 12 are tightly held together by a plurality of lag bolts 18, shown as four in number, which extend through holes in the lower plate 11 and intervening sheet 12 and screw into counterpart screw anchors 19 of elastomeric material nested in suitable holes 20 drilled into the upper plate. The holes 20 are preferably not deep enough to penetrate through to the outer face of the upper plate 10. Thus, the outer face of the upper plate 10 presents a smooth unbroken surface which may be readily wiped clean and provide good and firm contact with a work piece resting thereon. A lock washer 21 is preferably provided under the head of each of the lag bolts 18.

In operation and use, the work rest is secured in position at an appropriate level adjacent a grinder wheel. The work product to be ground on the grinder wheel is then rested on the outer face of the upper plate and pressed manually against the grinder wheel. Not only is the vibration of the product reduced but the level of sound in decibels is greatly reduced, from that which occurs with conventional work rests heretofore shown. I have found that, when using my improved work rest, workmen can tolerate a grinding operation for longer periods than heretofore and do so with much less fatigue than heretofore.

In the foregoing specification I have described a presently preferred embodiment of this invention, however, it will be understood that this invention can be otherwise embodied within the scope of the following claims.

I claim:

1. A grinding wheel work rest comprising an upper plate, a lower plate, a sheet of energy absorbing material therebetween, rigid spindle means secured centrally to said lower plate by which to mount the work rest, at least one elastomeric anchor in one of said plates, and screw means threadedly engaged with said elastomeric anchor for holding said plates and sheet snugly together, the screw means is off set from a longitudinal axis of the spindle means.

2. A work rest according to claim 1, wherein said upper and lower plates are of steel.

3. A work rest according to claim 1, wherein said sheet of energy-absorbing material comprises elastomeric material.

4. A work rest according to claim 1 wherein said sheet of energy-absorbing material comprises cork.

5. A work rest according to claim 1, wherein said upper plate comprises a steel plate of uniform thickness, said lower plate comprises a steel plate of uniform thickness substantially less than that of the upper plate, and said intervening sheet comprises a relatively thin sheet of elastomeric material of uniform thickness.

6. A grinding wheel work rest comprising:
 a. an upper plate;
 b. a lower plate with a central circular hole therethrough;
 c. a sheet of energy absorbing material therebetween;
 d. screw means for holding the plates and sheet snugly together; and
 e. a spindle secured centrally to the lower plate by which to mount the work rest, the spindle is of circular cross-section snugly fitting the hole but out of contact with the intervening sheet, the spindle is secured to the lower plate by a circular weld inside the hole and by a circular weld outside the hole.

* * * * *